US005091737A

United States Patent [19]

Toganoh et al.

[11] Patent Number: 5,091,737

[45] Date of Patent: Feb. 25, 1992

[54] RECORDING DEVICE

[75] Inventors: Shigeo Toganoh; Yohji Matsufuji; Hiroo Ichihashi, all of Tokyo, Japan

[73] Assignee: Canon Kabushiki Kaisha, Tokyo, Japan

[21] Appl. No.: 366,276

[22] Filed: Jun. 13, 1989

Related U.S. Application Data

[63] Continuation of Ser. No. 124,422, Nov. 23, 1987, abandoned, which is a continuation of Ser. No. 758,028, Jul. 23, 1985, abandoned, which is a continuation of Ser. No. 424,409, Sep. 27, 1982, Pat. No. 4,559,543.

[30] Foreign Application Priority Data

Oct. 13, 1981 [JP] Japan .............. 56-163635
Oct. 13, 1981 [JP] Japan .............. 56-163636
Oct. 14, 1981 [JP] Japan .............. 56-163715

[51] Int. Cl.$^5$ .............. G01D 15/18
[52] U.S. Cl. .............. 346/140 R; 346/75
[58] Field of Search .............. 346/75, 140 R

[56] References Cited

U.S. PATENT DOCUMENTS 3,975,740 8/1976 Distler et al. .............. 346/75
4,157,552 6/1979 Nakajima .............. 346/141
4,235,555 11/1980 Aprato .............. 400/120 X
4,314,259 2/1982 Cairns et al. .............. 346/75
4,338,610 7/1982 Sellin et al. .............. 346/75
4,345,262 8/1982 Shirato et al. .............. 346/140 R
4,356,499 10/1982 Kodama .............. 346/75
4,359,752 11/1982 Nakagawa et al. .............. 346/140 R
4,369,456 1/1983 Cruz-Uribe et al. .............. 346/140 R
4,370,664 1/1983 Horike et al. .............. 346/75
4,396,923 8/1983 Noda .............. 346/76 PH
4,399,348 8/1983 Bakewell .............. 219/216 X
4,463,359 7/1984 Ayata et al. .............. 346/1.1
4,499,478 2/1985 Matsufuji .............. 346/140 R

OTHER PUBLICATIONS

"Adjustable Ink Jet Head Assembly", C. M. Denny, IBM Tech Disc Bull, vol. 15, No. 9, pp. 2287, 2788, Feb '73.

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A recording device comprises a plural number of ink jet device units, each unit comprising an ink jet head portion, its drive controlling portion and a wiring portion, juxtaposed on a common base plate.

20 Claims, 5 Drawing Sheets

RECORDING DEVICE

This application is a continuation of application Ser. No. 07/124,422 filed Nov. 23, 1987now abandoned, which in turn is a continuation of application Ser. No. 06/758,028, filed July 23, 1985, now abandoned, which in turn is a continuation of application Ser. No. 06/424,409, filed Sept. 27, 1982, now U.S. Pat. No. 4,559,543.

BACKGROUND OF THE INVENTION

1. Field of the Invention

This invention relates to a recording device, and particularly to a recording device equipped with an ink jet system generally called "full-line multi-array type".

2. Description of the Prior Art

Among various recording systems presently known in the art, the so called ink jet recording system, which is the non-impact recording system substantially without noise during recording and capable of high-speed recording, even on plain paper without specific fixation treatment, is a very useful system in realizing recording devices such as various printers, word processors, copying machines, etc.

And, the ink jet recording system performs recording by permitting small droplets of recording liquid (referred to as "ink" in the following description) to fly based on various principles of action and attaching them onto a material to be recorded such as a paper. The device for generating ink droplets to be used in such an ink jet recording system, namely an ink jet system, is constituted mainly of an ink jet head portion for formation of ink droplets and a supply system for supplying ink to said portion.

As the first mode of the ink jet head as mentioned above, there are those generally called the "single type" or "semi-multi type", having about 1 to 10 ink discharging outlets. In these ink jet heads, the structure of the head is relatively simple and exchange operations at the time of failure or breaking of the head are easy and not too expensive.

However, when using another mode of the head generally the "full-lime multi-array type" to be used for printing one line of a paper substantially at the same time, the exchange operation of the head is not easy although probability of failure or breaking of a part of the head is increased. Moreover, exchange of the head as a whole is limited from the aspect of cost.

SUMMARY OF THE INVENTION

An object of the present invention is to provide a recording device equipped with a full-line multi-array type ink jet system which has overcome the problems as mentioned above and is high in reliability.

Another object of the present invention is to provide a recording device equipped with a full-line multi-array type ink jet system in which exchange of the parts is easy and the maintenance of the device as a whole is simple.

According to one aspect of the present invention, there is provided a recording device which comprises a plural number of ink jet device units, each unit comprising an ink jet head portion, its drive controlling portion and a wiring portion, juxtaposed on a common base plate.

According to another aspect of the present invention, there is provided a recording device which comprises a base plate for supporting a plural number of ink jet devices previously constituted separately, positions for juxtaposing said devices on at least one side of said base plate, and respective ink jet devices fixed so as to coincide with those positions.

According to a further aspect of the present invention, there is provided a recording device which comprises a front plate provided on a base plate for supporting a plural number of ink jet devices which are previously constituted separately, a standard plane set at a part of the front plate, and the respective ink jet devices bein arranged on said base plate so that each ink discharging plane of said devices may coincide with said standard plane.

According to still another aspect of the present invention, there is provided a recording device which comprises a plural number of ink jet device units, each unit having an ink jet head portion and its own drive controlling portion and wiring portion, juxtaposed on a common supporting base plate, and the wiring portions of said respective units being electrically connected to each other by contact under pressure with a lead for transmission of signals which is common to these wiring portions.

DETAILED DESCRIPTION OF THE PREFERRED EMBODIMENTS

The present invention is described in detail below based on the embodiments as illustrated in the accompanying drawings.

Figure 1:
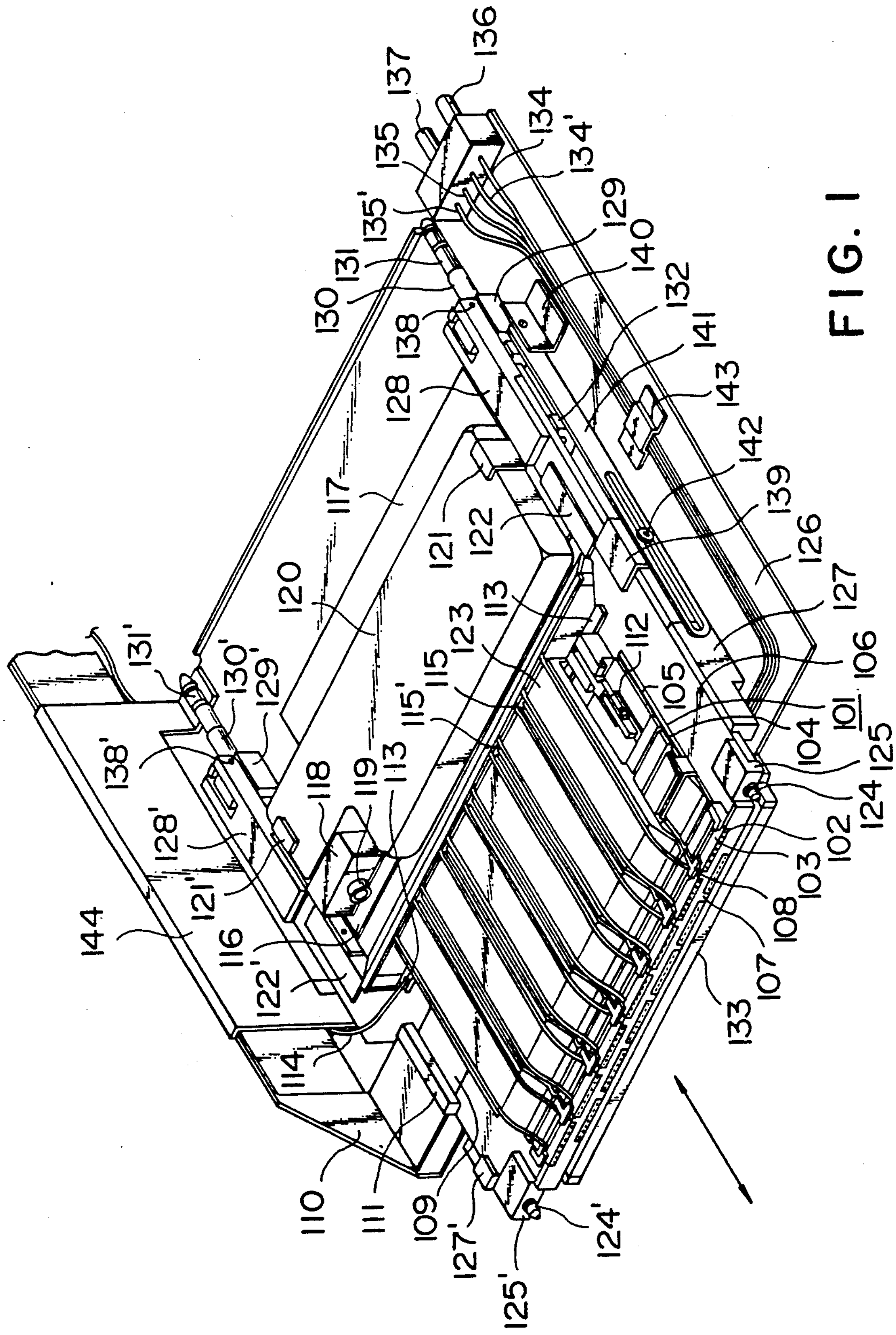
FIG. 1 shows a perspective view of the appearance of the recording device according to the present invention.

FIG. 1 is a perspective view of the appearance of the recording device of the present invention. In FIG. 1, 101 is a recording head unit and the recording head unit 101 is constituted of an ink jet head portion 103 having plural orifices 102 arranged on a line, a drive controlling portion 104 and a wiring portion 105. The head portion 103, the drive controlling portion 104 and the wiring portion 105 are connected to each other through bonding wire or flexible print plate, etc. (not shown in the drawing), and the head unit 101 is set so as to be capable of printing individually by input of a recording signal to the wiring portion 105. The numeral 106 denotes a supporting plate, which as shown in FIG. 1 (and also in FIGS. 4 and 5), provides a member having a supporting surface for said head unit 101 and a plural number of said head units 101 are juxtaposed on both the surface and the backside of the plate 106, which surfaces constitute first and second opposed major surfaces, to provide orifices 102 in a so called "full-line arrangement" to a width of a certain printing paper (namely, corresponding to one line). And, each head unit 101 is detachably mounted on the supporting plate 106 so that its fixed position may be adjusted in the right and left direction by the head registration plate 107 provided on the supporting plate 106, while the fixed position in the vertical direction may adjusted by the head holding plate 108.

The numeral 109 denotes a matrix flexible print plate for transmission of the output signal from the signal output portion (not shown) in the drawing through the cable 110 and the connector 111 to the wiring portion 105 of each head unit 101. That is pressure contacted with the individual wiring portion 105 for each head unit 101 by means of the pressing jig 112 to be connected to each wiring portion 105. Thus, the print plate 109 and each wiring portion 105 are not bonded to each other, but they are freely detachable.

A plate for mounting lead terminals is shown by 113, to which another signal wire 114 from the signal output portion (not shown in the drawing) for driving the head unit 101 and the signal wire (not shown in the drawing) connected directly to the head portion 103 of each head unit 101 are detachably connected by screwing, etc.

The numerals 115 and 115' both denote ink supplying pipes for supplying ink from the ink tank 116 to a respective head portion 103.

Two ink supplying pipes 115, 115' are connected to each head portion 103, and ink is supplied to the head portion 103 through the two supplying pipes 115, 115' at the time of ink discharging. Alternatively, through a valve mechanism (not shown in the drawing) provided within the ink tank 116, ink may also be circulated under pressure between the ink tank 116 and the head portion 103 by using one of the pipes for feeding under pressure and the other for ink recovery.

The ink tank 116 is provided with a cylinder block 117 equipped internally with a pressure pump for actuating the aforesaid valve mechanism and an air filter block 118 having a vent. The air filter block 118 has a detachable cap 119 mounted thereon for prevention of scattering of ink during transportation.

The ink tank 116 is also provided with ink supplementing inlets (not shown) through which ink is supplemented from the tank for supplement 120 so that the ink level in the ink tank 116 may be maintained substantially constant. The tank for supplement 120 is detachably fastened to the ink tank 116 by the fixing claws 121, 121' provided on the ink tank side 116 so that exchange between new and old tanks may be possible, if desired.

The ink tank 116 is fixed on the ink tank base (not shown in the drawing), and it is also fixed through metal fittings 122, 122' to the supporting plate 106.

The numeral 123 shows a cover of the head unit 101 provided with grooves for fixing the ink supplying pipes 115, 115', and the cover 123 is provided for the purpose of preventing the head unit 101 from contamination with ink, etc., or breaking due to shock during handling.

Each of 124, 124' shows a registration pin which is fitted into a pin holder provided in a paper conveying system to set the desired distance between the orifice 102 of each head portion 103 and the recording paper as well as other positional relations. The registration pins 124 and 124' are secured through the respective brackets 125 and 125' onto the supporting plate 106.

The numeral 126 denotes a base plate for mounting the ink jet recording device shown in the drawing on the body of a machine (not shown in the drawing), with the supporting plate 106 placed thereon. The base plate 126 is provided with a driving mechanism for moving the supporting plate 106 on the base plate 126 and capping mechanisms for the orifices 102.

The supporting plate 106 is supported at its front portion by the supporting plate guides 127, 127' and at its rear portion by the hinge holders 129, 129' via the hinge stands 128, 128' provided on the supporting plate 106. The hinge holders 129, 129' are slidable via the respective guide shaft collars 130, 130' on the two guide shafts 131, 131'. And, the guide shaft 131 is supported by the guide shaft bracket 132 on the base plate 126 (not shown on the guide shaft 131' side).

By moving the guide shaft collars 130, 130' forwardly or backwardly along the guide shafts 131, 131', respectively, the supporting plate 106 will slide on the guides 127, 127' in the directions of the arrows in the drawing, whereby it is possible to set the front end surface of the head at the desired position of recording position, capping position, maintenance position, etc.

The numeral 133 denotes a head for performing capping and cleaning of the orifices 102 and has jetting holes for jetting out air or washing liquid against the orifices and suction holes for sucking these materials (neither of these sets of holes is shown in the drawing) provided on the side face confronting the orifices. The jetting holes and the suction holes are connected, at places not shown in the drawing, to the pressurizing side tubes 134, 134' and the suction side tubes 135, 135', respectively, which also communicate with the joints 136 and 137, said joint 136 on the pressurizing side being connected through the lubricator (not shown) and said junction 137 on the suction side through the filter (not shown) to the pressurizing side and the suction side, respectively, of the pump (not shown). The cleaner head 133 which is also a cap is also set so as to take a position for recording, a position for capping and a position for maintenance, corresponding to the movement of the aforesaid supporting plate 106. The supporting plate 106 is rotatable around the shafts of the hinge pins 138 and 138' provided on the hinge stands 128 and 128' so that the face of the supporting plate 106 on the side of the orifice 102 may form a circular arc, when rotated and the supporting plate 106 can be fixed at a desired angle relative to the surface of the base plate 126 by pressing a stay 141 against the stay angle 139 with a screw 142. One end of the stay 141 is rotatably secured to the stay angle 140 fixed on the base plate 126. The stay angle 139 is fixed to the supporting plate 106.

Further, the screw 142 for fixing can be drawn off from the stay angle 139 to dismantle easily the supporting plate 106 from the base plate 126.

143 is a tube guide for fixing tubes 134, 134', 135, 135' on the base plate 126, and 144 is a case for protection of the cable 110 and the signal wire 114. Such a protective case can prevent the cable 110 and the signal wire 114 from damage or cutting by sudden application of external pressure when the ink jet recording device is mounted on the body of a machine (not shown in the drawing).

Figure 2:
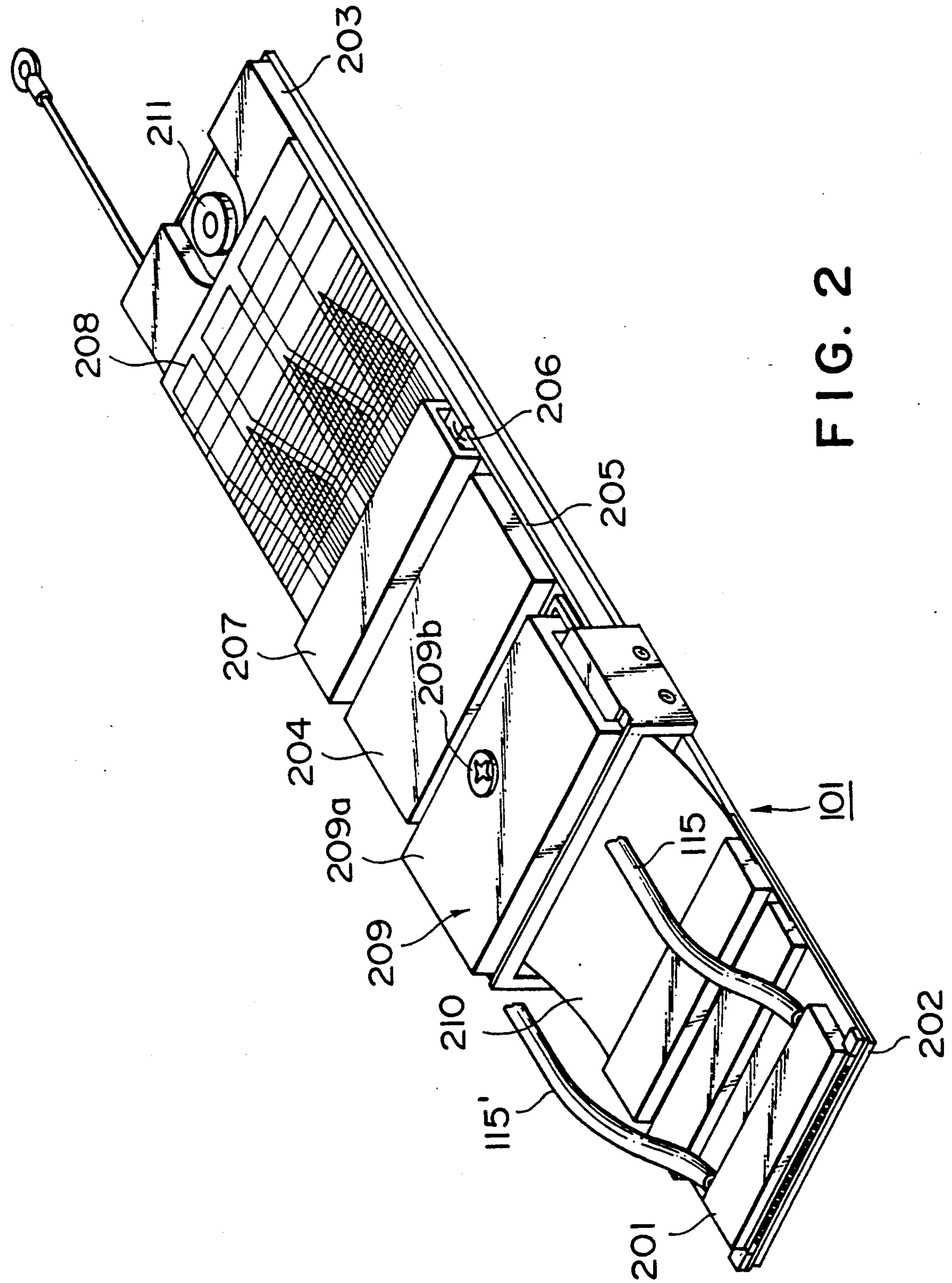
FIG. 2 shows a perspective view of the appearance of the head unit according to the present invention.

Referring now to FIG. 2, the recording head unit 101 shown in FIG. 1 is to be described in detail.

In FIG. 2, 202 is a head unit base plate, on one of the shorter sides of which there is fixed an ink jet head portion 201, and a wiring portion supporting stand 203 is mounted on the surface of the base plate 202 at the rear end region of the head portion 201. The supporting stand 203 is fastened through engagement with a screw 211 fixed to the base plate 202, but there is no adhesion between the supporting stand 203 and the base plate 202, and the supporting stand 203 may be made slidable on the base plate 202 or both can be separated from each other by removal of the screw 211. Further, on the upper surface of the supporting stand 203, there are mounted a wiring plate 205 and a multi-layer wiring plate 208 in that order from front to back and both are connected by the bonding 206. In this connection, 207 is a cover for the aforesaid bonding portion 206 and, if desired, it can be dismantled from the wiring plate 205 or the multi-layer wiring plate 208. The aforesaid wiring plate 205 and multi-layer wiring plate 208 are adhered simply to the supporting stand 203 at their backsides so that they may be separated from the stand, if desired.

The numeral 204 denotes a drive controlling portion, which is fixed on the wiring plate 205 with electrical connection.

The numeral 210 denotes a flexible print plate including a lead wires concerned with the ink jet head portion 201, one end of which is pressure contacted on the aforesaid wiring plate 205 by means of a holding jig 209 to effect electrical connection therebetween. And, by loosening of the fastening screw 209*b* on the upper plate 209*a* of the holding jig, the flexible print plate 210 can be separated from the wiring plate 205.

As described above, the recording head unit 101 can be assembled by uniting the main parts, comprising head portion 201, the flexible print plate 210, the wiring plate 205, the drive controlling portion 204 and the multi-layer wiring plate 208, which are previously constituted separately, on a common base plate 204, and, if desired, each part is readily exchangeable.

Figure 3:
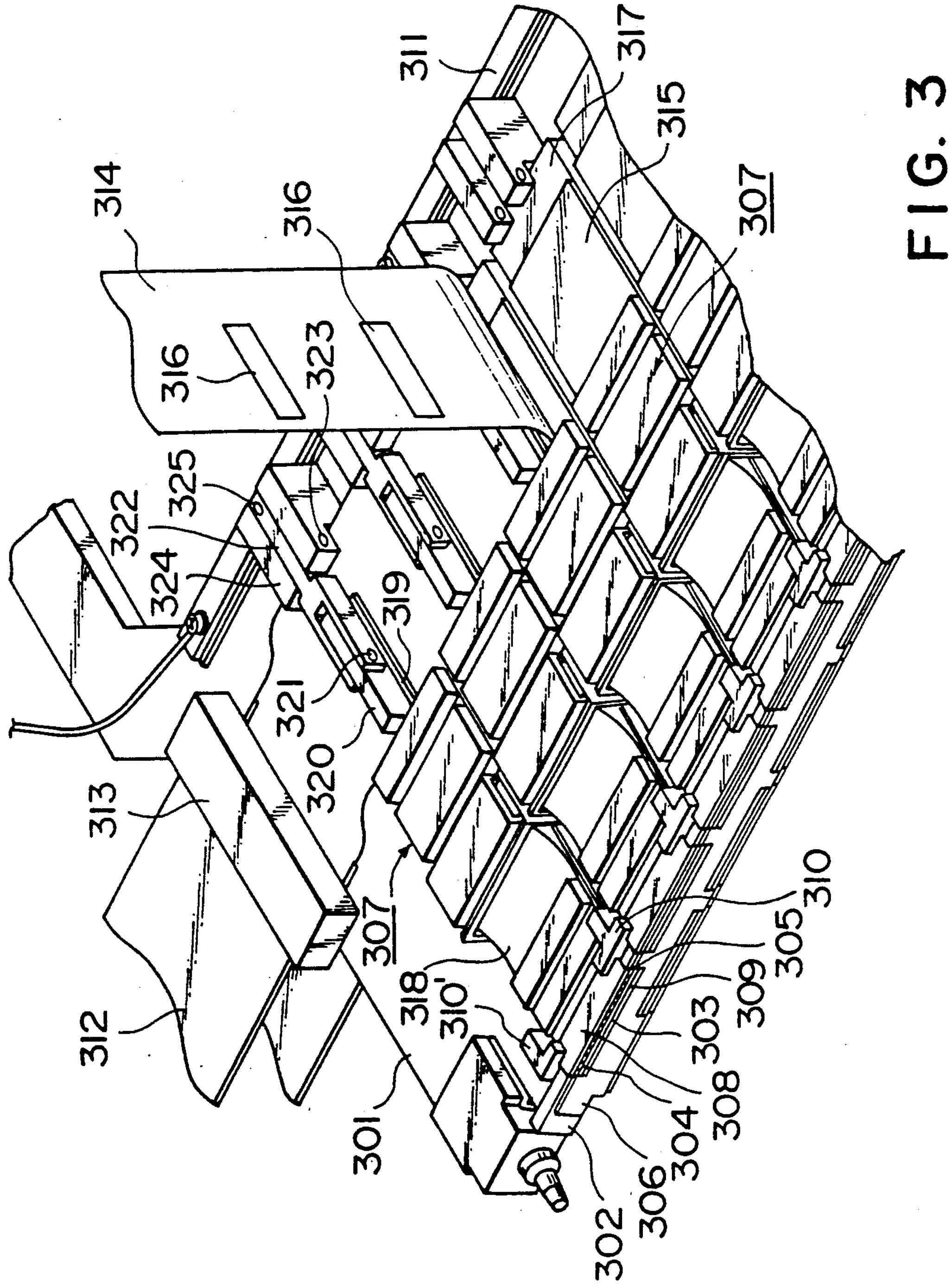
FIG. 3 shows a partial perspective view of the appearance of the recording device of the present invention for illustration of the main parts of the present invention.

FIG. 3 is a partial perspective view of the appearance of the recording device according to the present invention, for illustration of mounting of the recording head unit 101 as shown in the embodiment shown in FIG. 1 on the supporting plate 106 in detail.

In FIG. 3, the head registration plate 302 provided on the supporting plate 301 is provided with the standard positioning plane 304 in the right and left direction of the orifice 303 and the standard positioning plane 306 in the back and forth direction of the orifice face 305.

The standard planes 304 are provided all in the same direction relative to the standard position of one side end surface of the head registration plate 302, corresponding to the number and positions of the recording head units 307 to be provided on the supporting plate 301. On the other hand, the side face of the head portion 308 of the head unit 307 facing toward the standard plane 304 is worked with a high surface precision, and by butting the side face of the head portion 308 against the standard plane 304, the positional slippage in the right and left direction of the orifices 303 due to arranging plural head portions 308 can be kept within ½ of the pitch of the orifice 303.

The standard plane 306 in the back and forth direction of the orifice face 305 in the head registration plate 302 is common to all the head portions 308 provided on the supporting plate 301, and the orifice faces 305 of the respective head portions 308 can be provided on the same plane by bringing the orifice faces 305 of the respective head units 307 to coincide with the standard plane 306 of the head registration plate 302.

As the method to make the respective orifice faces 305 coincident with the standard plane 306, there is, for example, the method in which a detachable flat plate is contacted with the standard plane 306 and the orifice faces 305 of respective head portions 308 are brought in a butt against this plate. According to this method, the respective orifice faces 305 can be made to coincide correctly with the standard plane 306.

After respective head units 307 are arranged at predetermined positions on the supporting plate 301 as described above, the unit base plates 309 of respective head units 307 are fixed at their rear portions on the supporting plate 301 with fixing claws (not shown in the drawing). The unit base plates 309 are relatively thin and, particularly when they have insufficiant flatness, the front portions of the unit base plates 309 will come off from the supporting plate 301, especially around the head portions 308, by fixation of the rear portions to the supporting plate 301 with fixing claws. Accordingly, with the head unit setting plane as the standard, the head portions 308 are pressed by the head holding plates 310, 310' so that the orifices 303 of respective head portions 308 may be arranged on the same line, thus defining the vertical positions thereof, whereby the backside of the base plate 309 can be fixed in close contact with the supporting plate 301.

The head holding plates 310, 310' not only define the vertical portions of the head portions 308 as described above, but also can prevent positional slippages of the head portions 308 through peeling off from the unit base plate 309, for example, when the head portions 308 are fixed by means of adhesion or the like onto the unit base plate 309 and the adhesion force becomes insufficient as a result of dissolving of the adhesive by the ink oozed out from the orifices 303.

Thus, after a predetermined number of head units 307 are arranged at predetermined positions on the supporting plate 301, the first signal wires (not shown) connected directly to respective head portions 308 are connected to the lead terminal mounting plate 311 by way of screwing or the like.

Then, the second signal wires 312 from the signal output portions (not shown) are connected via the connector 313 and the matrix flexible print plate 314 to the wiring portions 315 of respective head units 307. On the face of the matrix flexible print plate 314 confronting the wiring portion 315, there are provided exposed conductor portions 316 at positions corresponding to the wiring portions 315 of respective head units 307, with the one end of the flexible print plate 314 being connected to the connector 313.

For connection of the flexible print plate 314 to the wiring portions 315, registration between the wiring portions 315 and the exposed conductor portions 316 is first effected. Registration between the wiring portions 315 and the exposed conductor portions 316 can be conducted with relative ease, since the head units 307 are fixed on the supporting plate 301 by the unit base plate 309, the supporting stands 317 on which the wiring portions 315 are placed can be moved on the unit base plate 309 within the degree of freedom of the flexible print plate 318, and the widths of the wiring portions 315 and the conductors of the flexible print plate 314 are wide enough to effect registration by visual observation.

After registration between the wiring portions 315 and the exposed conductor portions 316, the flexible print plate is successively attached under pressure through rubber sheets 319 to the wiring portions 315 by means of the press rods 320.

The press rod 320 is engaged with the press lever 322 through the shaft 321 so as to be rotatable around the shaft 321 as the center, and the press lever 322 is engaged with the lever fixing stand 324 fixed on the supporting plate 301 through the shaft 323 so as to be rotatable around the shaft 323 as the center.

The press lever 322 is provided with a press screw 325. By screwing of the press screw, the press rod 320 will bring the flexible print plate 314 in pressure contact with the wiring portion 315 through the rubber sheet 319, whereby the wiring portion 315 and the flexible print plate 314 are electrically connected to each other, and the supporting stand 317 is fixed on the unit base plate 309 at the same time.

Thus, when it is necessary to exchange the head units 307 fixed to the supporting unit, the press screw 325 is first loosened to dismantle the press lever 322 and the press rod 320 from the flexible print plate 314, and further the unit base plate 309 is taken off from the fixing claws (not shown) simultaneously with dismantling of the head holding plates 310, 310', whereby each head unit 307 can be dismantled from the supporting plate 301. And, after exchange of the head units 307, the new ones may be fixed at the predetermined positions according to the procedure opposite to the dismantling procedure as described above to complete the exchange operations for respective head units.

Figure 4:
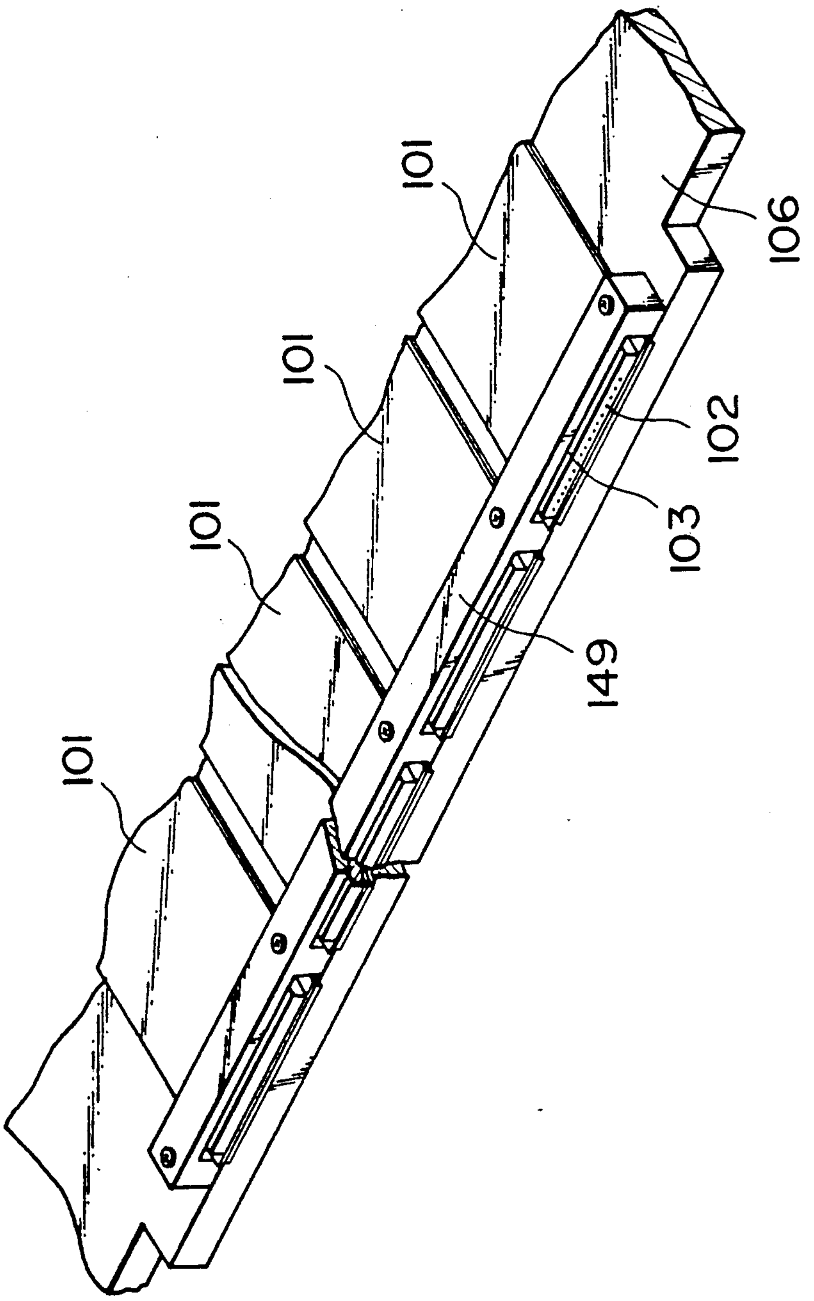
FIG. 4 and FIG. 5 are perspective views of the appearance of the main parts of other embodiments of the recording device of the present invention.
Figure 5:
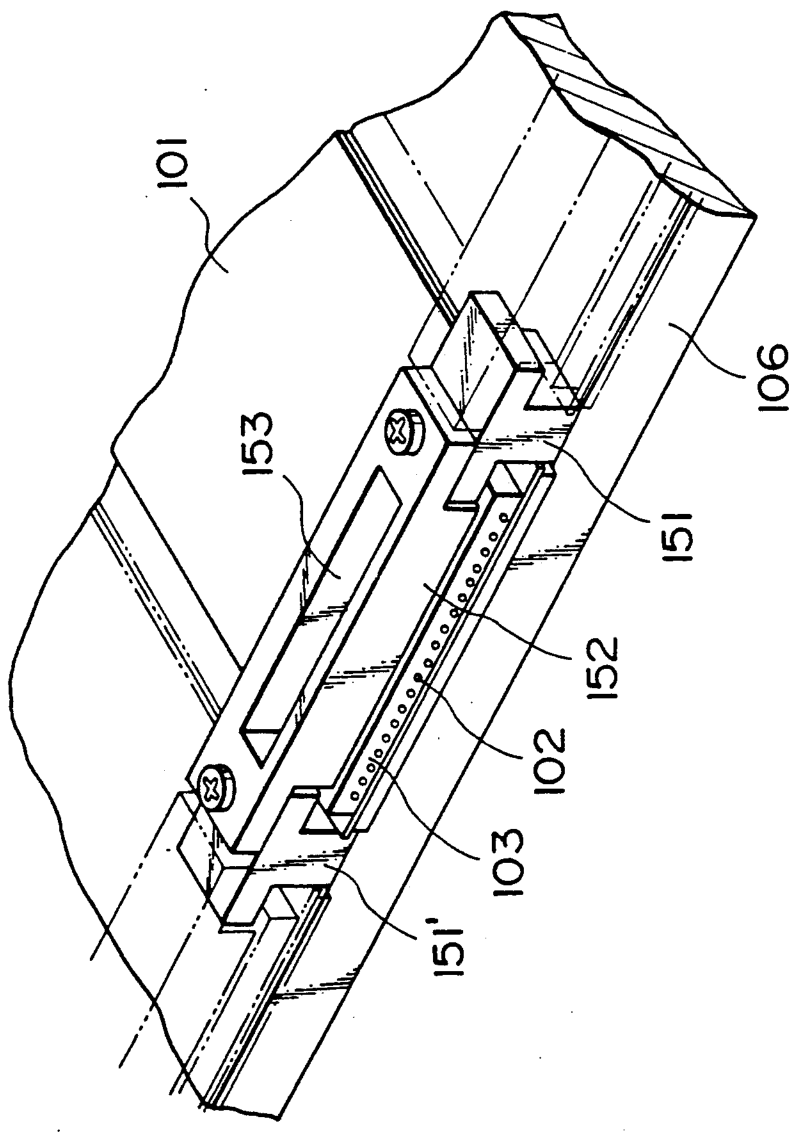

FIG. 4 and FIG. 5 show embodiments wherein modifications are made to the head holding plates as described above.

FIG. 4 shows an embodiment wherein the respective head portions of the head unit 101 arranged on the supporting plate 106 are all fixed with the head holding plate 149, and FIG. 5 an embodiment wherein the head portions of respective head units 101 are fixed individually through the supporting stands 151, 151' with the head holding plate 152. In the latter arrangement, the head holding plate 152 is provided with vertical through holes 153 so that the situation within each head portion can be observed.

In the present invention, by constituting the head holding plate as shown by 310, 310' in FIG. 3 or 152 in FIG. 5, the inner condition within each head portion can be made observable. Also, by making the head holding plate in a shape as shown in FIG. 4 or FIG. 5 and using a material with good thermal conductivity, the temperature distribution at each head portion 103 can be made uniform, whereby the difference in viscosity created by the temperature difference of the ink supplied to respective orifices 102 and further to respective head units 101 can be eliminated to enable stabilization of discharging of the ink from respective orifices 102.

As described above, in the present invention, a plural number of recording head units previously constituted separately are assembled and arranged to complete a recording device. This enables setting of the positions of respective units to be arranged with very good precision. Moreover, the ink discharging outlets existing in all units can thereby be arranged accurately on a line. Further, in the present invention, at the time of assembling of respective recording head units, the constitutional parts can be scrutinized sufficiently to give an assembly constituted only of parts with good performance. As previously mentioned, when it is necessary to exchange the units due to damage, etc., only the part concerned need be subjected to exchange operation and, therefore, maintance of the recording device as a whole can be performed very efficiently and economically.

We claim:

1. A recording device which comprises:

a common supporting plate, a plural number of ink jet device units mounted on said common supporting plate, each said unit having plural ink discharging outlets, wherein said plural outlets of each said unit are arranged in a row and each said unit comprises an ink jet head portion having said outlets therein, a drive controlling portion for driving said ink jet head portion selectively to discharge droplets from said outlets in response to electrical signals supplied to said drive controlling portion and a wiring portion for enabling electrical signals to be supplied to said driving portion, means for accurately arranging said rows of outlets of said units in predetermined positions relative to each other, holding members in contact with said units proximate to said outlets for detachably clamping said accurately arranged units onto said common supporting plate by pressing each said unit against said common supporting plate, and an electrical lead connected to said wiring portions of all of said units.

2. A recording device according to claim 1, wherein for each unit said ink jet head portion, said drive controlling portion and said wiring portion are arranged on said common supporting plate in the named order.

3. A recording device according to claim 1, wherein said ink jet head portion, said drive controlling portion and said wiring portion are electrically connected to each other in each of said units.

4. A recording device according to claim 1, wherein said common supporting plate has first and second opposed major surfaces and said units are juxtaposed on both said surfaces of said supporting plate.

5. A recording device according to claim 1, wherein said means for accurately arranging said outlets of each said unit comprises a head registration plate and respective standard positioning planes for accurate alignment in a direction toward and away from a line, and for accurate arrangement in a direction along said line.

6. A recording device which comprises:

a supporting plate, a plural number of ink jet devices mounted on said supporting plate, each said ink jet device having a plural number of ink orifices arranged in a row, means defining positions for accurately juxtaposing said ink jet devices in predetermined positions relative to each other on at least one side of said supporting plate, and holding members in contact with said ink jet devices proximate to said orifices for detachably clamping said accurately juxtaposed ink jet devices onto said supporting plate by pressing each said ink jet device against said supporting plate.

7. A recording device according to claim 6, wherein said supporting plate has first and second opposed major surfaces and plural numbers of said ink jet devices are juxtaposed on both of said surfaces of said supporting plate.

8. A recording device which comprises:

a common supporting plate, a plural number of ink jet device units having ink discharging outlets, each said unit having an ink jet head with said outlets arranged in a row, a drive controlling portion and a wiring portion, all of said units being juxtaposed on said common supporting plate, means for accurately arranging said rows of outlets of said units to be in predetermined positions relative to each other, a flexible sheet having a plurality of electrical lead portions for supplying electrical signals to said wiring portions of said units, and a plurality of pressing means for detachably clamping said flexible sheet onto said wiring portions of adjacent said units by pressing each said lead portion against a corresponding said wiring portion, wherein each said wiring portion and said corresponding lead portion have cooperating matrix wiring.

9. A recording device according to claim 8, wherein said ink jet head portion, said drive controlling portion and said wiring portion are electrically connected to each other in each of said units.

10. A recording device according to claim 8, wherein said supporting plate has first and second opposed major surfaces and said units are juxtaposed on both of said surfaces of said supporting plate.

11. A recording device according to claim 8, wherein said units are detachably clamped to said supporting plate by holding members in contact with said units proximate to said outlets.

12. A recording device according to claim 8, wherein said ink jet head portion, said drive controlling portion and said wiring portion are arranged on each of said units in the order listed.

13. A recording device according to claim 8, wherein said means for accurately arranging said outlets of each said unit comprises a head registration plate and respective standard positioning planes for accurate alignment in a direction toward and away from a line, and for accurate arrangement of the outlets in a direction along said line.

14. A recording device which comprises:

a supporting member having a supporting surface, an ink jet device unit mounted on said supporting member, said unit having an ink jet head portion having a plural number of ink discharging outlets, and a holding member for detachably clamping said unit onto said supporting surface, said holding member including a pressure holding member for clamping said unit between said pressure holding member and said supporting member by contacting said ink jet head portion proximate to said discharging outlets.

15. A recording device according to claim 14, wherein said discharging outlets are arranged between two pressure contact surfaces of said pressure holding member.

16. A recording device according to claim 15, wherein said pressure holding member is made of a heat conductive material capable of maintaining the temperature of the ink discharged from said discharging outlets substantially constant.

17. A recording device according to claim 15, wherein said pressure holding member has a through hole corresponding to said head portion.

18. A recording device according to claim 17, wherein said pressure holding member is made of a heat conductive material capable of maintaining the temperature of the ink discharged from said discharging outlets substantially constant.

19. A recording device according to claim 14, wherein said holding member holds a pair of opposite surfaces of said head portion.

20. A recording device according to claim 14, further comprising a signal supplying member for transmitting electrical signals for driving said unit, wherein said unit has a wiring portion, said electricity supplying member and said wiring portion have cooperating matrix wiring and said holding members effect electrical connection of said matrix wirings by clamping said signal supplying member to said wiring portion.

* * * * *